United States Patent
Soubjaki

(10) Patent No.: US 11,428,338 B2
(45) Date of Patent: Aug. 30, 2022

(54) MULTI-MODE FLUID CONTROL VALVE

(71) Applicant: Hanon Systems, Daejeon (KR)

(72) Inventor: Houssam Soubjaki, Detroit, MI (US)

(73) Assignee: Hanon Systems, Daejeon (KR)

( * ) Notice: Subject to any disclaimer, the term of this patent is extended or adjusted under 35 U.S.C. 154(b) by 0 days.

(21) Appl. No.: 17/388,304

(22) Filed: Jul. 29, 2021

(65) Prior Publication Data
US 2022/0243837 A1 Aug. 4, 2022

Related U.S. Application Data

(60) Provisional application No. 63/144,263, filed on Feb. 1, 2021.

(51) Int. Cl.
*F16K 11/074* (2006.01)
*F16K 27/02* (2006.01)
*F16K 17/04* (2006.01)
*F16K 11/052* (2006.01)

(52) U.S. Cl.
CPC ........ *F16K 27/0209* (2013.01); *F16K 11/052* (2013.01); *F16K 17/048* (2013.01); *F16K 27/0263* (2013.01); *Y10T 137/86863* (2015.04)

(58) Field of Classification Search
CPC .............................................. Y10T 137/86863
See application file for complete search history.

(56) References Cited

U.S. PATENT DOCUMENTS

| | | | |
|---|---|---|---|
| 3,258,920 A * | 7/1966 | Hott | B66F 3/42 60/434 |
| 4,222,413 A * | 9/1980 | Wulf | F16K 11/207 251/188 |
| 4,915,132 A * | 4/1990 | Hodge | F16K 11/0743 128/205.24 |
| 9,500,299 B2 | 11/2016 | Morein et al. | |
| 2006/0060245 A1 * | 3/2006 | Baumgarten | B01D 61/06 137/311 |
| 2019/0368621 A1 | 12/2019 | Marchand et al. | |

FOREIGN PATENT DOCUMENTS

| | | |
|---|---|---|
| JP | 01089688 U | 6/1989 |
| JP | 2016089901 A | 5/2016 |
| KR | 1020190110032 A | 9/2019 |

OTHER PUBLICATIONS

Notification of Transmittal of the International Search Report for International Application No. PCT/KR2021/018622, dated Mar. 24, 2022.

* cited by examiner

*Primary Examiner* — Robert K Arundale
(74) *Attorney, Agent, or Firm* — Gregory Ozga; Warn Partners, P.C.

(57) ABSTRACT

A multi-mode fluid control valve that has a housing with a fluid control chamber having a first end wall with at least one passage and a second end wall with at least two passages. There is also a puck positioned in the fluid control chamber that is rotatably connected to a drive shaft at a drive shaft connection aperture in the puck. The puck has a first side facing the first end wall of the flow control chamber. The puck has at least two passages separated by divider walls. The puck further includes at least one flow diverter extending between the first side of the puck to the second side of the puck. The flow diverter is adjacent one of the two passages and is configured to divert fluid in the fluid control chamber toward the passage that is adjacent the flow diverter.

20 Claims, 12 Drawing Sheets

MULTI-MODE FLUID CONTROL VALVE

CROSS-REFERENCE TO RELATED APPLICATION

This application is a Non-Provisional Application which claims the benefit of U.S. Provisional Patent Application No. 63/144,263 filed Feb. 1, 2021. The disclosure of the above application is incorporated herein by reference.

FIELD OF THE INVENTION

The present invention relates to a multi-mode fluid control valve implementing a rotatable control puck.

BACKGROUND OF THE INVENTION

In the field of fluid control, customers will have certain requirements for a particular application. Typically, the requirements for fluid medium valves must meet certain criteria for sealing, pressure drop, friction, fluid channeling and size. All of these requirements must be carefully customized to the application but unfortunately, the requirements can contradict themselves in many aspects, thereby requiring a compromise when selecting a valve. For example, often times more sealing means more friction, providing a lower pressure drop requires a larger valve size, and so on. Therefore, there is a need to create a fluid control valve that has modular components that can be selected based on the requirements of a particular application.

SUMMARY OF THE INVENTION

The present invention mainly focuses on the rotating component, referred to as the "puck", of the present multi-mode fluid control valve. The puck component is made up of any moldable or fabricated material and is used to redirect the fluid and also carry the sealing components. The puck assembly includes multiple sub-components sandwiched together to form the sealing interface. The puck assembly is connected to an actuator and as it rotates, passages open and close to redirect fluid, while sealing fluid from entering unwanted areas. Sealing materials are also selected to reduce friction. This solution provides multi-mode fluid control valves that can be optimized depending on application requirements that include, but are not limited to, friction, leak rate, pressure drop and size. The solution provided by the present invention also provides flexibility in channeling the fluid.

The driveshaft is typically connected to an actuator or a source of power that rotates the puck. The puck is constructed of any fabricated material such as injection molded polymer, cast/machined aluminum, pressed metal etc. and has incorporated channels that direct the fluid in different directions. On either side of the puck axial surfaces are lined with a low friction element (moving ceramic discs for instance) or highly polished surface. This enables the valve to both seal well while maintaining low friction.

The present invention is directed to a multi-mode fluid control valve that has a housing with a fluid control chamber. The fluid control chamber has a first side with a first end wall and a second side with a second end wall. The first side has at least one port connected to the fluid control chamber and the second side has at least two ports connected to the fluid control chamber. A drive shaft extends at least partially into the fluid control chamber. There is also a puck positioned in the fluid control chamber and is rotatably connected to the drive shaft at a drive shaft connection aperture in the puck. The puck has a first side facing the first end wall of the flow control chamber. The puck has at least two passages separated by divider walls. The puck further includes at least one flow diverter extending between the first side of the puck to the second side of the puck. The flow diverter is adjacent one of the two passages and is configured to divert fluid in the fluid control chamber toward the passage that is adjacent the flow diverter.

The formed puck has the geometry flexibility to be adapted to specific applications which required certain flow paths between external ports. Each puck will be unique to the application and adaptation to the covers with hold the ports.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1A:
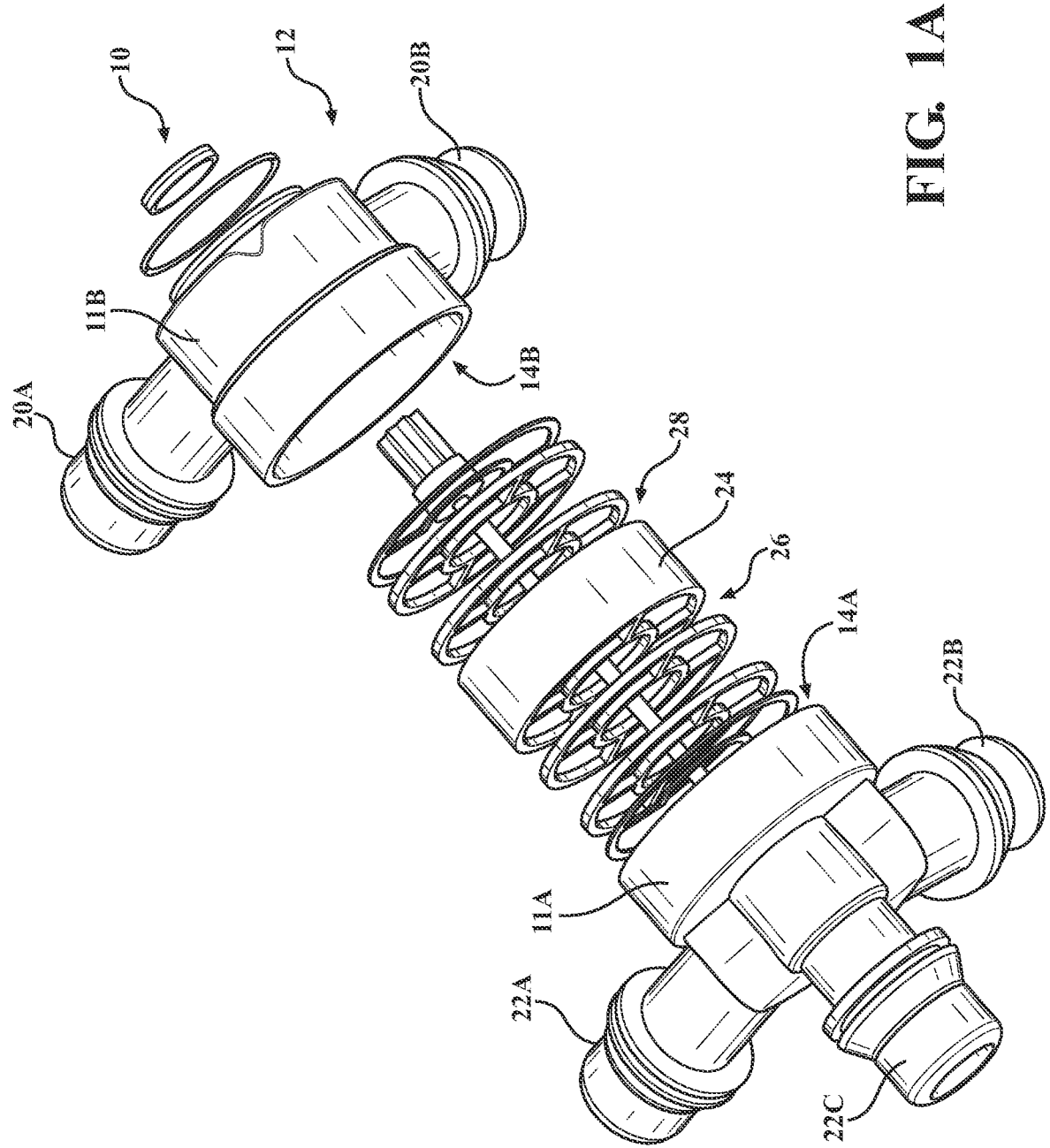
FIG. 1A is an exploded side perspective view of a multi-mode fluid control valve according to a first embodiment of the present invention.
Figure 1B:
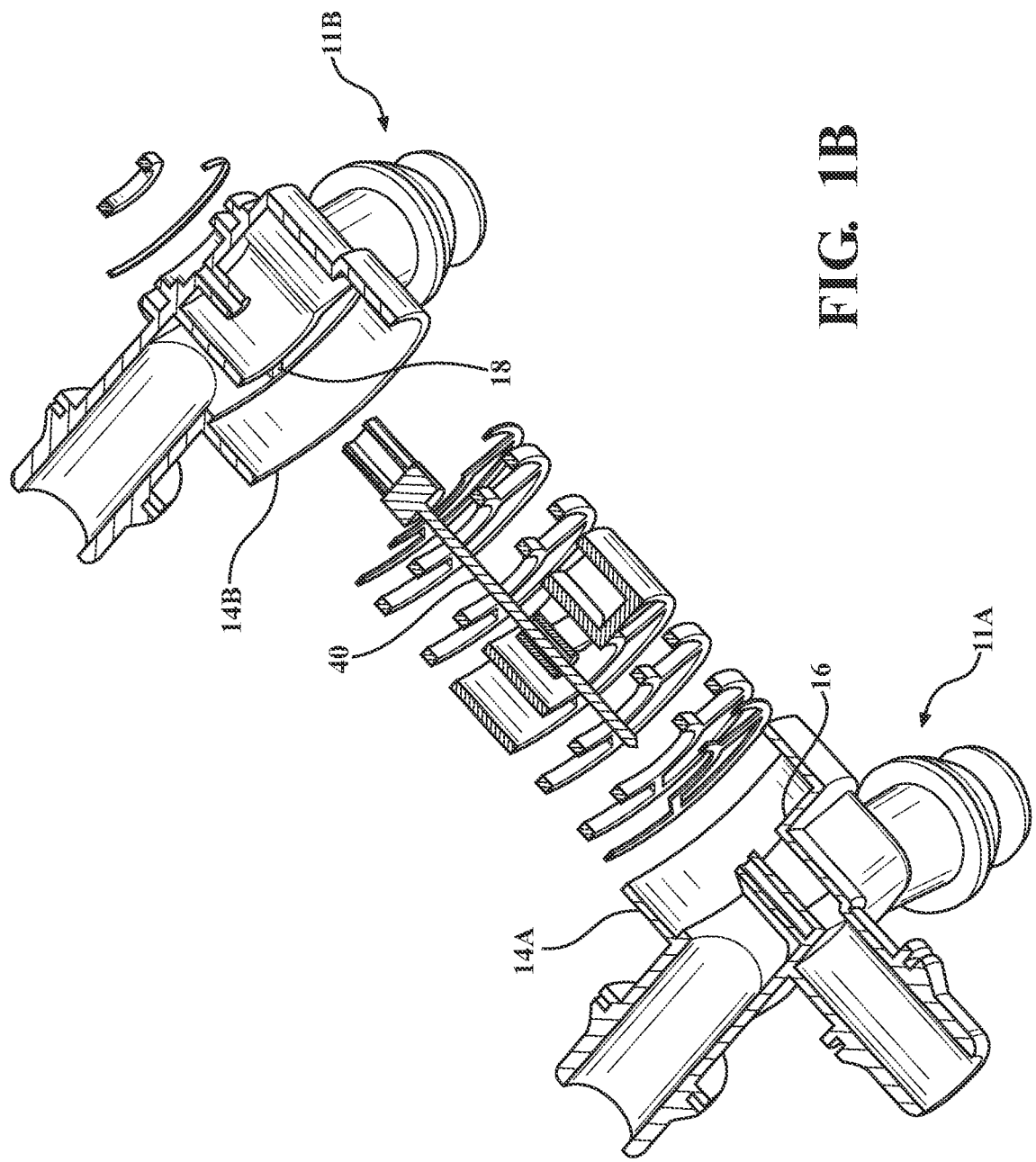
FIG. 1B is a cross-sectional exploded side perspective view of a multi-mode fluid control valve according to a first embodiment of the present invention.

The following description of the preferred embodiments are merely exemplary in nature and is in no way intended to limit the invention, its application, or uses.

Referring now to FIGS. 1-4 a multi-mode fluid control valve 10 is shown and described. The multi-mode fluid control valve 10 includes a housing 12 which in the present embodiment of the invention is a two piece housing having a lower cover 11A and an upper cover 11B. When assembled the housing 12 forms a fluid control chamber having a first side 14A.

Referring also to FIGS. 9A-9D greater details of the first side 14A of the lower cover 11A of the housing 12 and the second side 14B of the upper cover 11B of the housing 12 are shown and described. The terms "lower" and "upper" are used to describe the relationship of the covers on FIGS. 1A and 1B and are not intended to be limiting to the orientation of the multi-mode fluid control valve 10. Stated another way, the multi-mode fluid control valve 10 could be operated in any orientation. Connected to the first side 14A of the fluid control chamber is a first port 22A, second port 22B and a fifth port 22C, which all pass through the housing and connect to the first side 14A of the fluid control chamber. While three ports are shown connected to the first side 14A, it is within the scope of the invention for a greater or lesser number of ports to be implemented. On the surface of the end wall 16 is a first pocket 25A formed where the first port 22A enters the fluid control chamber, a second pocket 25B formed where the second port 22B enters the fluid control chamber, a fifth pocket 25C formed where the fifth port 22C enters the fluid control chamber. Additionally, there is a first closed pocket 25D and second closed pocket 25E that are in areas of the end wall 16 where no ports are connected. The first closed pocket 25D and second closed pocket 25E function to achieve the different modes of operation by only permitting fluid flow between desired pockets, which will be described in greater detail below. The first side 14A further includes divider walls 23A, 23B, 23C, 23D that extend between a circumferential flange 21 formed on the inside surface of the first side 14A of the housing 12 and a circumferential divider wall 23E that bisects the divider walls 23A, 23B, 23C, 23D. The divider walls 23A, 23B, 23C, 23D and the circumferential divider wall 23E separate the different pockets to control fluid flow between pockets depending on the position of a puck 24 (described below).

Connected to the second side 14B of the fluid control chamber is a third port 20A, and fourth port 20B, which all pass through the housing and connect to the second side 14B of the fluid control chamber. While two ports are shown connected to the second side 14B, it is within the scope of the invention for a greater or lesser number of ports to be implemented. On the surface of the end wall 18 is a first pocket 27A formed where the fourth port 20B enters the fluid control chamber, a second pocket 27B formed where the third port 20A enters the fluid control chamber. Additionally, a closed pocket 27C that are in areas of the end wall 18 where no ports are connected. The closed pocket 27C functions to achieve the different modes of operation by only permitting fluid flow between desired pockets, which will be described in greater detail below. The second side 14B further includes divider walls 29A, 29B, 29C that extend between a circumferential flange 31 formed on the inside surface of the first side 14A of the housing 12 and a circumferential divider wall 29D that bisects the divider walls 29A, 29B, 29C. The divider walls 29A, 29B, 29C and the circumferential divider wall 29D separate the different pockets to control fluid flow between pockets depending on the position of a puck 24 (described below).

Referring now to FIGS. 1A, 1B, 2A and 2B the details of the puck 24 are now shown and described. The puck 24 is positioned in the fluid control chamber and has a first side 26 facing the first end wall 16 of the fluid control chamber and a second side 28 facing the second end wall 18 of the fluid control chamber. The puck 24 is formed of any fabricated material, including but limited to injection molded polymer, case or machine molded aluminum, pressed metal, etc. The puck 24 has at least two passages 30A, 30B with flow diverters 32A, 32B that are adjacent a respective passage 30A, 30B. The flow diverters 32A, 32B extend from the first side 26 of the puck 24 to the second side 28 of the puck 24.

As shown best in FIG. 2B each flow diverter 32A, 32B has a stop surface 36A, 36B, which in the present embodiment of the invention is located at the first side 26 of the puck 24 and can completely block flow of fluid through one or both of the first port 22A, second port 22B or fifth port 22C, described in greater detail below. As shown best in FIG. 2A, each flow diverter 32A, 32B also has a respective flow transition surface 38A, 38B that diverts fluid flow to or from the passages 30A, 30B respectively. The flow transition surface 38A, 38B has a sloped or angled surface that slopes between the first side 26 to the second side 28 of the puck 24. The stop surface 36A, 36B and shape of each flow transition surface 38A, 38B can vary depending on a particular application. For example, the stop surface 36A, 36B could be positioned at the second side 28 of the puck instead of the first side 26, or they could be arranged in an alternating manner. It is also within the scope of the invention for there to be more than two stop surfaces and flow transition surfaces. Additionally, it is within the scope of this invention for the flow transition surface 38A, 38B to have a different shape depending on the need of a particular application. The flow transition surface can have a different shape, angle, and differ from one another. Additionally, there can be more than two flow transition surfaces and passages in the puck depending on the number of ports and desired modes of operation of the valve. Further provided is at least two divider walls 34A, 34B separating the at least two passages 30A, 30B and the flow diverters 32A, 32B. It is within the scope of this invention to have a greater or lesser number of dividers depending on a particular application.

During operation, the puck 24 is configured to rotate within the fluid control chamber to control the flow of fluid between the ports 20A, 20B, 22A, 22B, 22C. The rotation of the puck 24 is provide by a connection with a drive shaft 40 that extends at least partially into the fluid control chamber. The puck 24 includes a drive shaft connection aperture 42 to which the drive shaft 40 extends through and connects the puck 24 to the drive shaft 40. Rotation of the drive shaft 40 causes movement or rotation of the puck 24. To facilitate the transfer of rotational force between the drive shaft 40 and the puck 24, the drive shaft 40 has a fluted outer surface portion that connects with a mated fluted inner surface portion of the drive shaft connection aperture 42. The fluted shape helps to align or key the drive shaft 40 to the puck 24.

Figure 4B:
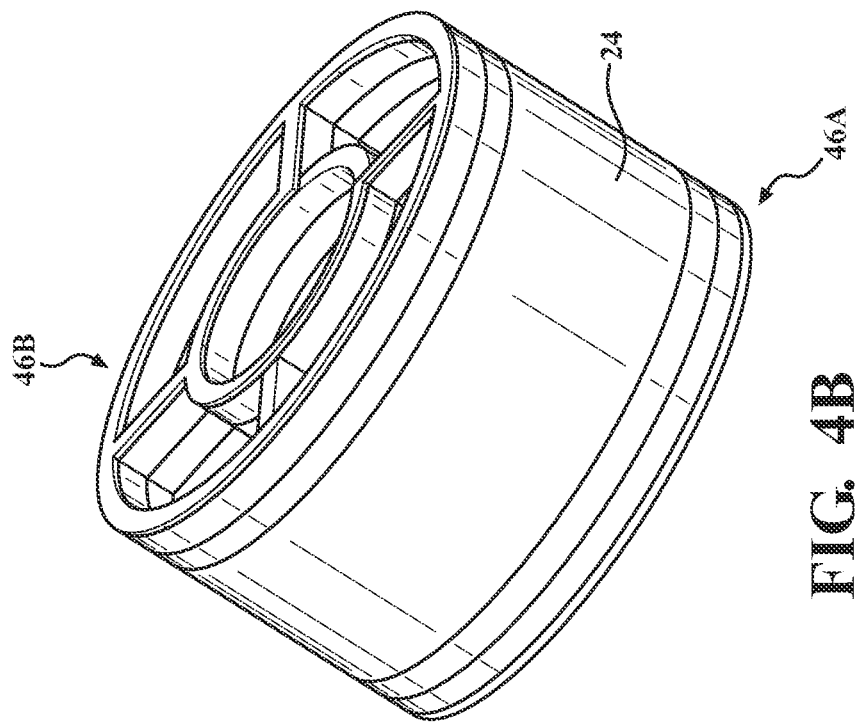
FIG. 4B a side perspective view of the puck assembly with mating components used in the multi-mode fluid control valve according to the first embodiment of the present invention.
Figure 4A:
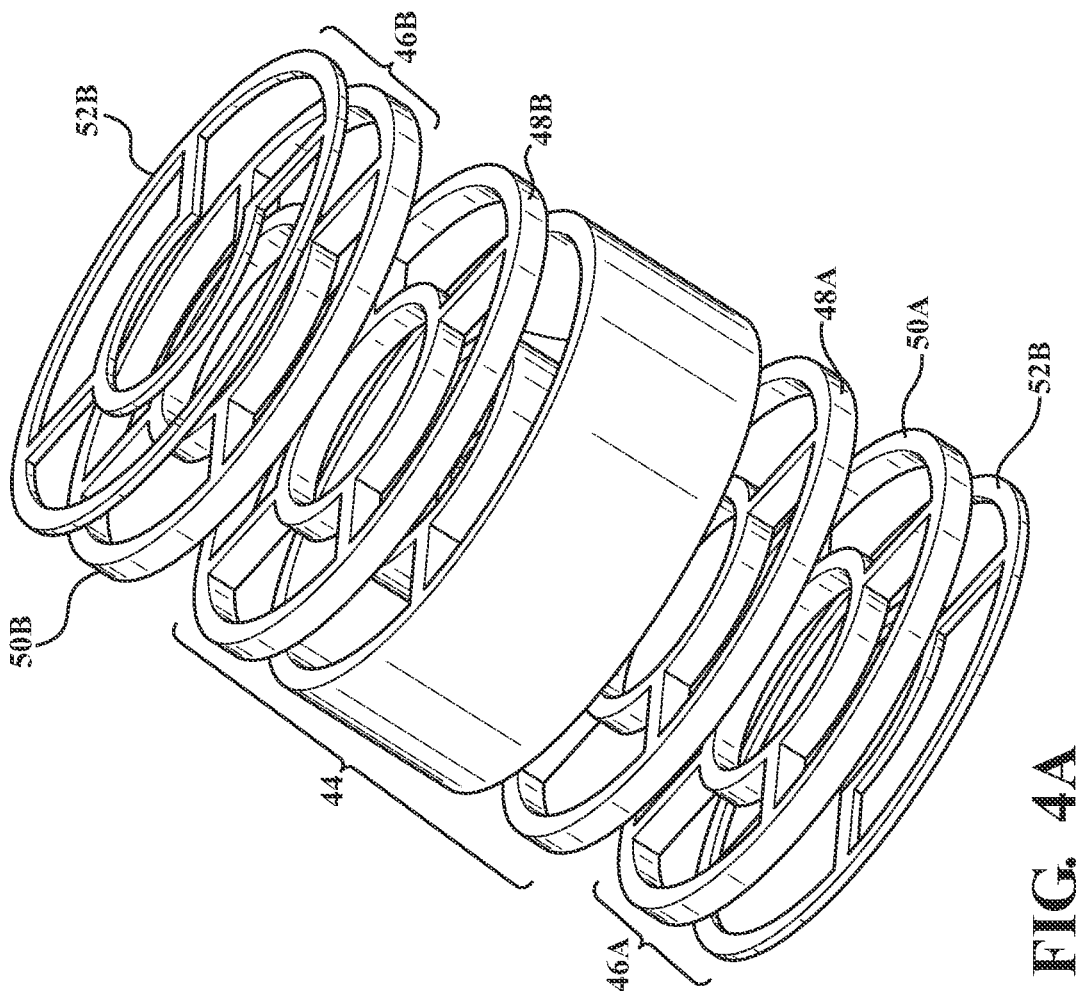
FIG. 4A is an exploded side perspective view of the puck assembly with mating components used in the multi-mode fluid control valve according to the first embodiment of the present invention.

Referring now to FIGS. 3A, 3B, 4A, 4B the details of a puck assembly 44 and mating components 46A, 46B are shown (whole assembly is shown in FIGS. 4A and 4B). The puck assembly 44 includes a first moving friction disk 48A connected to and rotatably with the first side 26 of the puck 24, between the first side 26 of the puck 24 and the first end wall 16 of the fluid control chamber. The first moving friction disk 48A prevents friction as the puck 24 rotates in the fluid control chamber. There is also a second moving friction disk 48B connected to and rotatable with the second side 28 of the puck 24, between the second side of the puck 24 and the second end wall 18 of the fluid control chamber. The second moving friction disk 48B prevents friction as the puck 24 rotates in the fluid control chamber. The first moving friction disk 48A and second moving friction disk 48B are connected to the puck 24 using different connections based on the need of a particular application. For example, adhesives, welding, over molding or other suitable connection methods can be used as long as the friction disks are secured to and rotate with the puck 24. The first moving friction disk 48A and second moving friction disk 48B are formed of any type of friction reducing material such as, but not limited to ceramic or some other type of material. Alternatively, there is a coating or polished surface on the puck 24 that replaces the first moving friction disk 48A or second moving friction disk 48B.

Connected within the fluid control chamber is a first stationary friction disk 50A and second stationary friction disk 50B that are connected to the respective first side 14A and second side 14B of the housing. The first stationary friction disk 50A and second stationary friction disk 50B are secured to the housing 12 using different connections based on the need of a particular application. For example, adhesives, welding, over molding or other suitable connection methods can be used as long as the first stationary friction disk 50A and second stationary friction disk 50B are secured and do not rotate within the housing 12. The first stationary friction disk 50A and second stationary friction disk 50B are formed of any type of friction reducing material, such as but not limited to ceramic or some other type of material. Between the first side 14A and the first stationary disk 50A is a stationary seal 52A, and the second side 14B and the second stationary friction disk 50B is a stationary seal 52B. The stationary seals 52A, 52B, which help to provide a fluid seal between the respective first stationary disk 50A and the first side 14A of the housing 12; and the respective second stationary disk 50B and the second side 14B of the housing 12. The first stationary disk 50A and first stationary seal 52A are shaped to align with and rest on the circumferential flange 21, divider walls 23A,23B,23C,23D and circumferential divider wall 23E. The second stationary disk 50B and second stationary seal 52B are shaped to align with and rest on the circumferential flange 31, divider walls 29A,29B, 29C,29D and circumferential divider wall 29E.

Referring now to FIGS. 5-8 the method of operation of the multi-mode fluid control valve 10 will now be described. For all of the different methods shown the different ports 20A, 20B, 22A, 22B, 22C are described as being ON with a fluid communication path or OFF with no fluid communication between the port that is OFF and any other ports connected to the fluid control chamber. The direction of flow through the multi-mode fluid control valve 10 is not described, because the flow of fluid between ports that are ON can be any combination or direction depending on the actual application of the multi-mode fluid control valve 10. Also it is within the scope of this invention for there to be a greater or lesser number of ports depending on a particular application.

Figure 5:
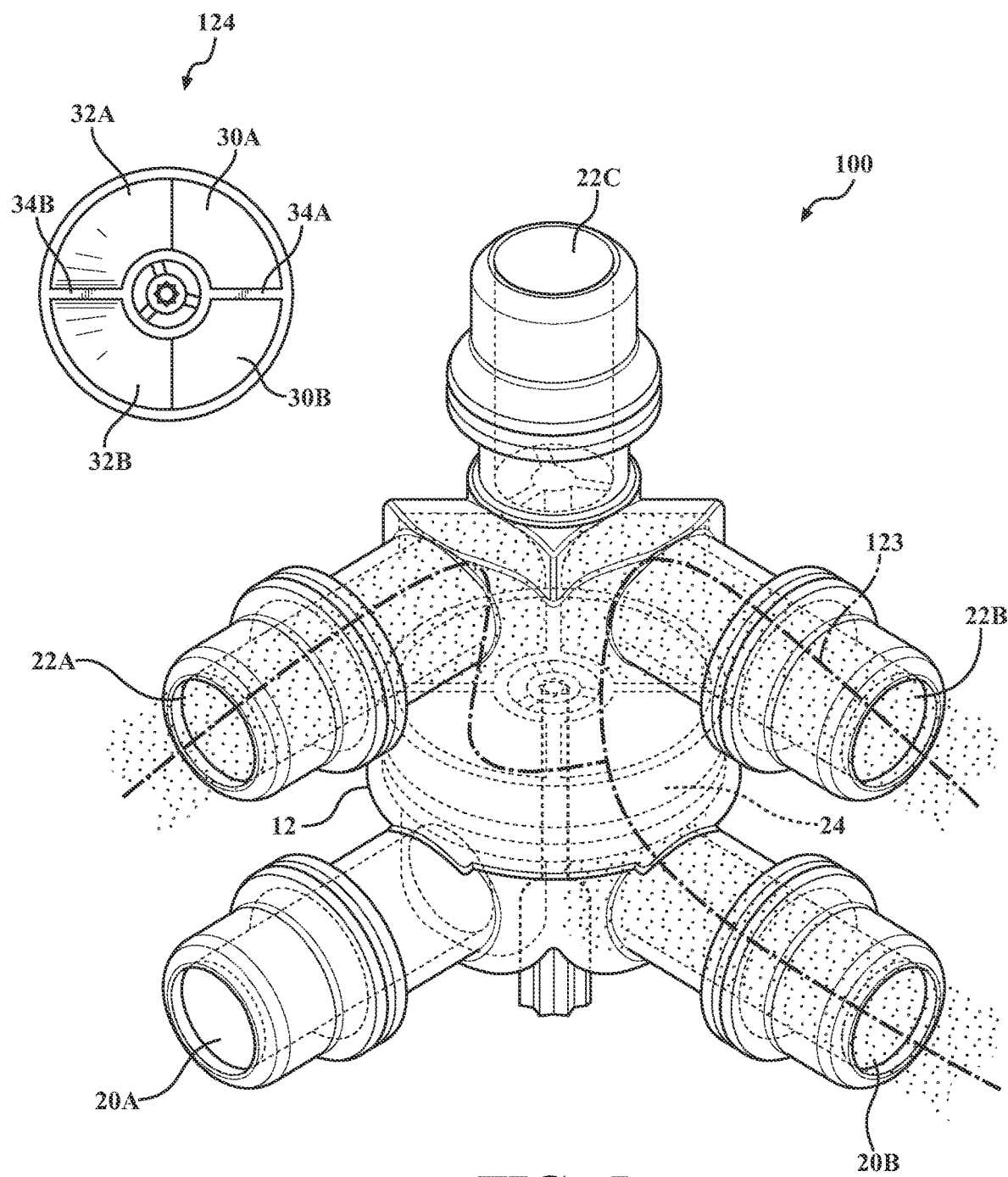
FIG. 5 is a schematic elevational view of the multi-mode fluid control valve operating in a first mode.

FIG. 5 depicts the multi-mode fluid control valve 10 operating in a first mode 100. When in the first mode 100 the puck 24 is rotated in the housing 12 to the position shown on a schematic puck 124 that is representative of a plan end view of the puck 24 when viewed from the top side of puck 24 within the housing 12 shown in FIG. 5. The position of the schematic puck 124 corresponds to the position of the puck 24 within the fluid control chamber. When in the first mode 100, the first port 22A, the second port 22B and the fourth port 20B are ON so that there is a fluid communication path 123 schematically represented, between the fluid control chamber, the first port 22A, the second port 22B and the fourth port 20B. The third port 20A and fifth port 22C are OFF and there is no fluid communication with other ports connected to the fluid control chamber.

Figure 2A:
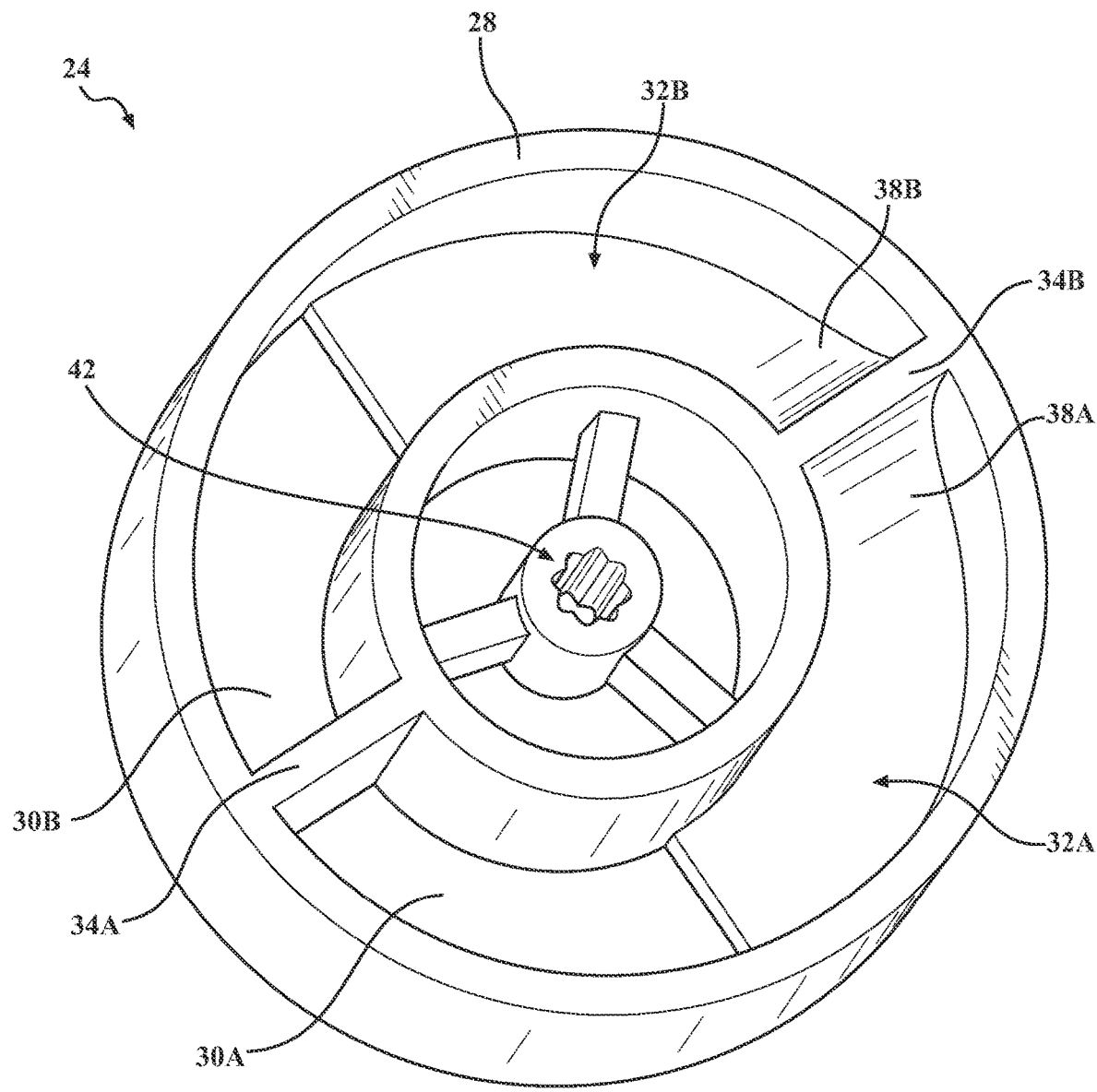
FIG. 2A is a perspective view of a first side a puck used in the multi-mode fluid control valve according to the present invention.
Figure 2B:
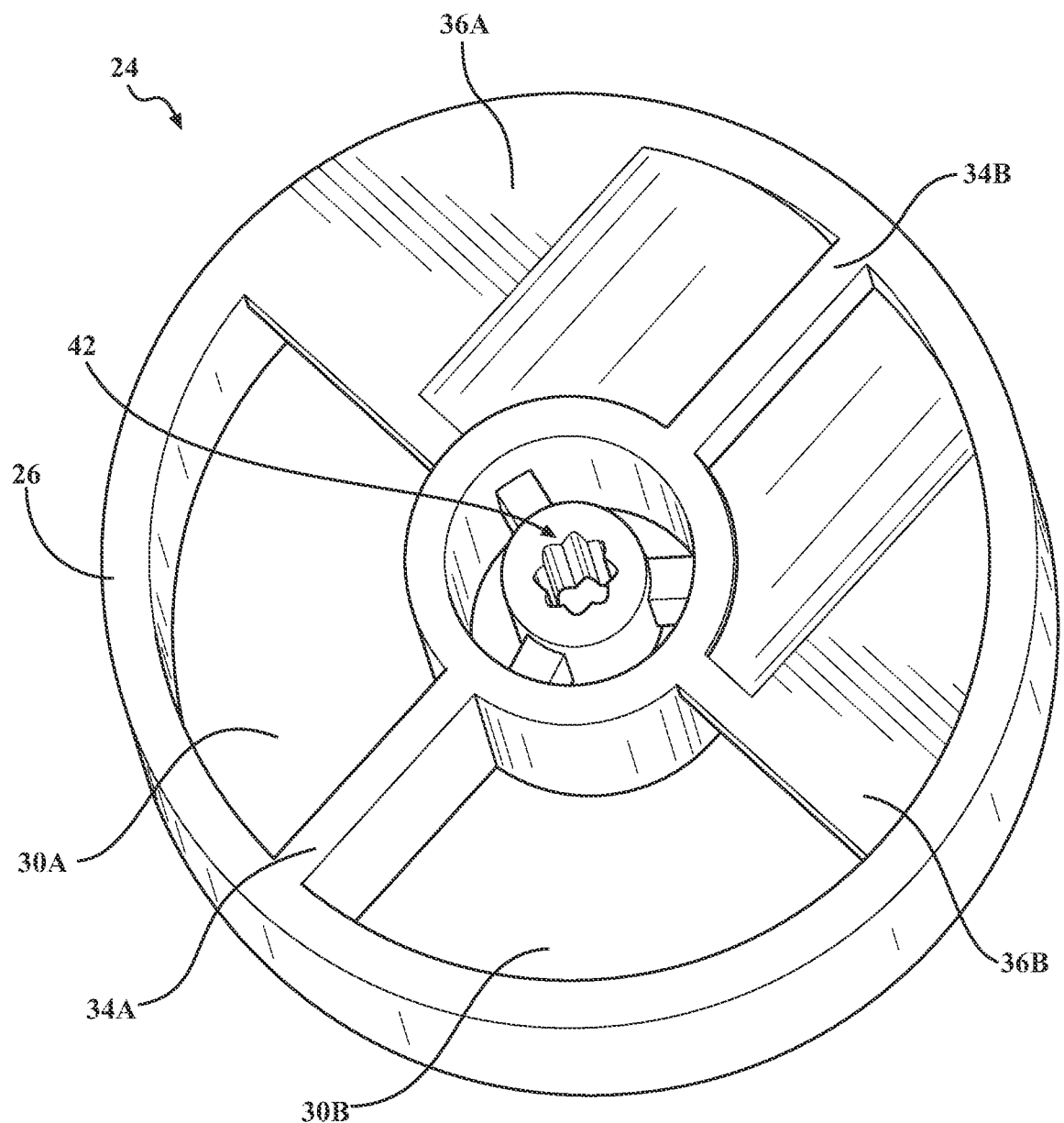
FIG. 2B is a perspective view of a second side a puck used in the multi-mode fluid control valve according to the present invention.
Figure 3B:
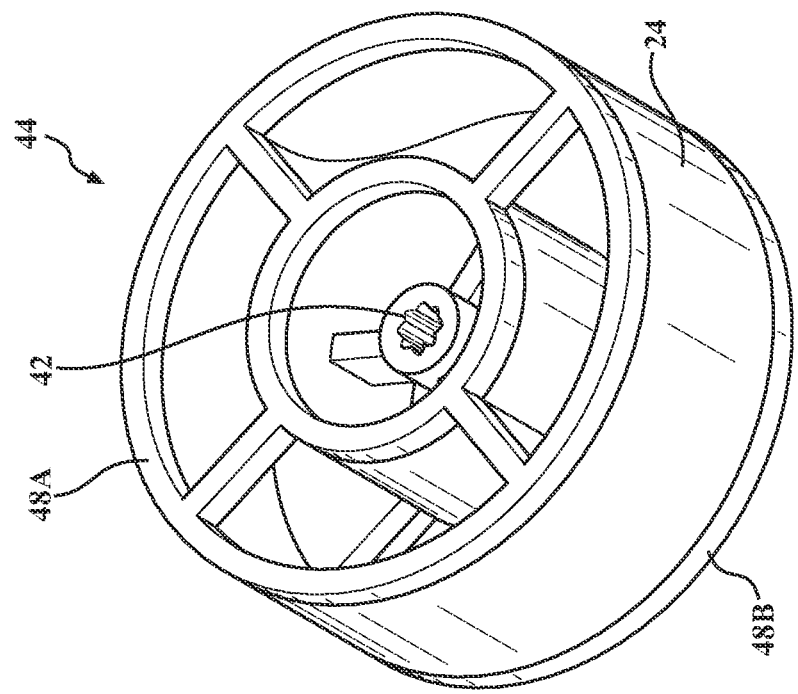
FIG. 3B is an exploded perspective view of the second side of a puck assembly used in the multi-mode fluid control valve.
Figure 3A:
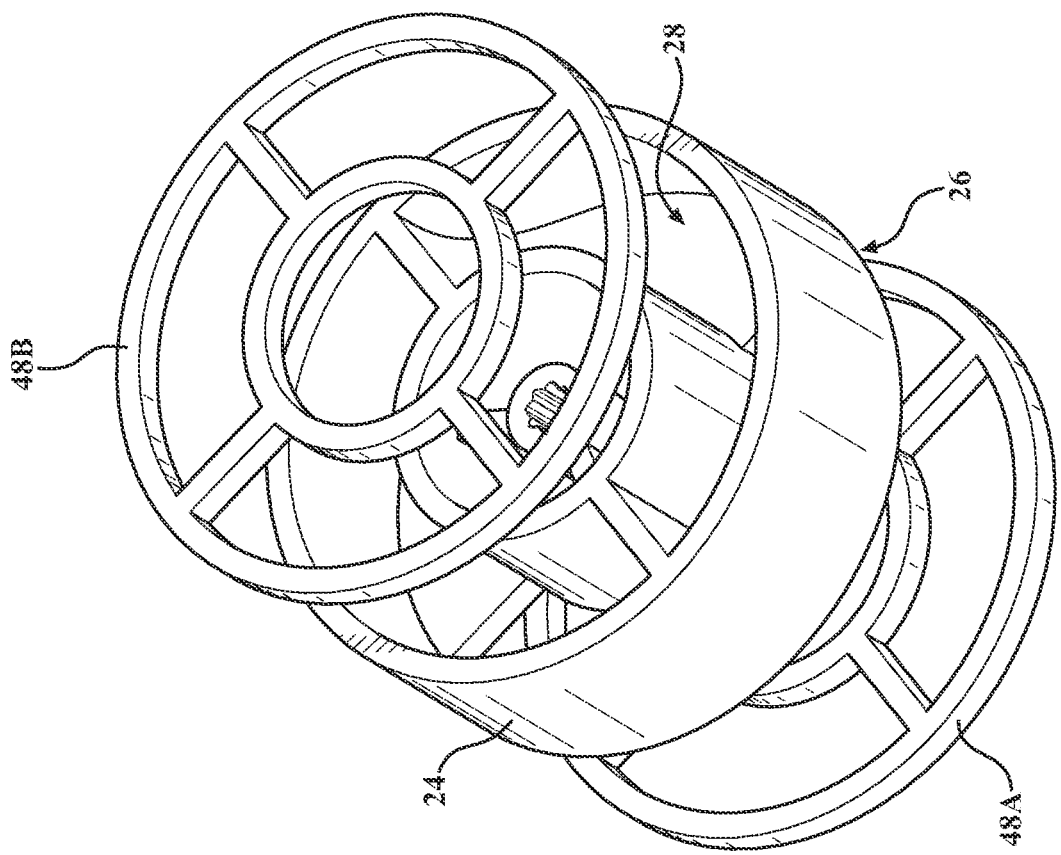
FIG. 3A is an exploded perspective view of the first side of a puck assembly used in the multi-mode fluid control valve.
Figure 6:
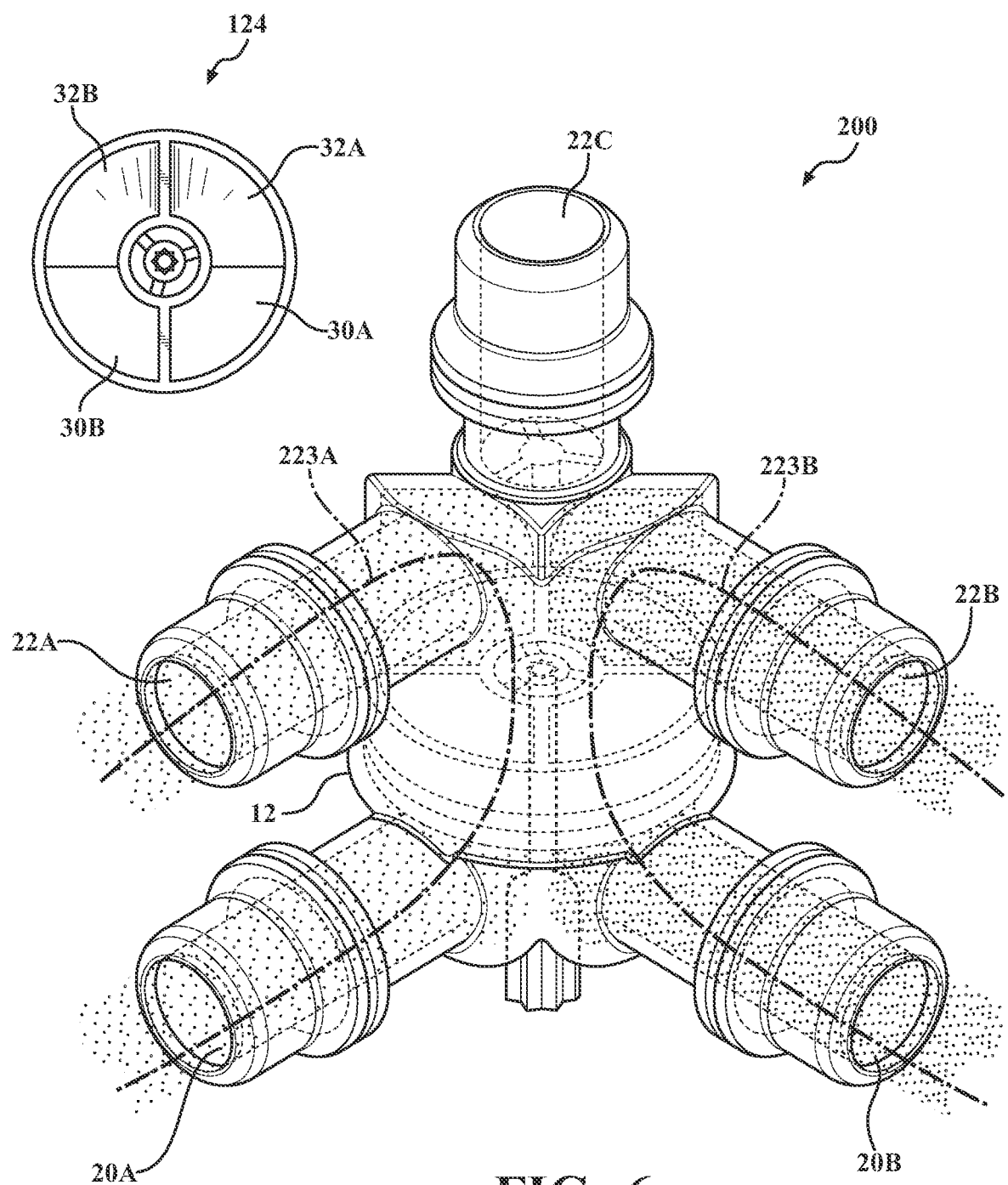
FIG. 6 is a schematic elevational view of the multi-mode fluid control valve operating in a second mode.

Referring now to FIGS. 2A, 2B and 5, in the first mode 100 the puck 24 (also represented by the schematic puck 124) is positioned so that flow deflector 32B is adjacent the first pocket 25A of the first side 14A of the housing 12 and deflects fluid to and from the first pocket 25A, which is also connected to the first port 22A, across the flow deflector 32B to the passage 30B. The passage 30B is open and positioned between second pocket 25B and first pocket 27A of the second side 14B of the housing 12, thereby allowing fluid to flow vertically between the second port 22B and fourth port 20B. The stop surface 36A and stop surface 36B blocks the second pocket 27B and to render the third port 20A OFF. Also, the passage 30A is positioned between the closed pocket 27C first closed pocket 25D of the first side 14A of the housing, which isolates the fifth port 22C rendering it OFF. FIG. 6 depicts the multi-mode fluid control valve 10 operating in a second mode 200, which happens when the schematic puck 124, and puck 24 are rotated ninety degrees clockwise relative to the position of the schematic puck 124 in the first mode 100. When in the second mode 200 the puck 24 is rotated in the housing 12 to the position shown on a schematic puck 124 that is representative of a plan end view of the puck 24 when viewed from the top side of puck 24 within the housing 12 shown in FIG. 6. The position of the schematic puck 12 corresponds to the position of the puck 24 within the fluid control chamber. When in the second mode 200 there are two separate fluid communication paths 223A, 223B. The first port 22A and the third port 20A are on and define the fluid communication path 223A that is schematically represented, between the fluid control chamber, the first port 22A, the third port 20A. The second port 22B and the fourth port 20B are on and define the fluid communication path 223B that is schematically represented, between the fluid control chamber, the second port 22B and the fourth port 20B. The fifth port 22C is OFF and is not in fluid communication with any other port connected to the fluid control chamber.

Referring now to FIGS. 2A, 2B and 6, in the second mode 200 the puck 24 (also represented by the schematic puck 124) is positioned so that passage 30B is adjacent and between first pocket 25A, second pocket 27B allowing fluid communication path 223A between first port 22A and third port 20A. Passage 30A is adjacent and between second pocket 25B and first passage 27A allowing fluid communication path 223B between second port 22B and fourth port 20B. Stop surface 36A blocks closed pocket 27C and renders the fifth port 22C OFF.

Figure 7:
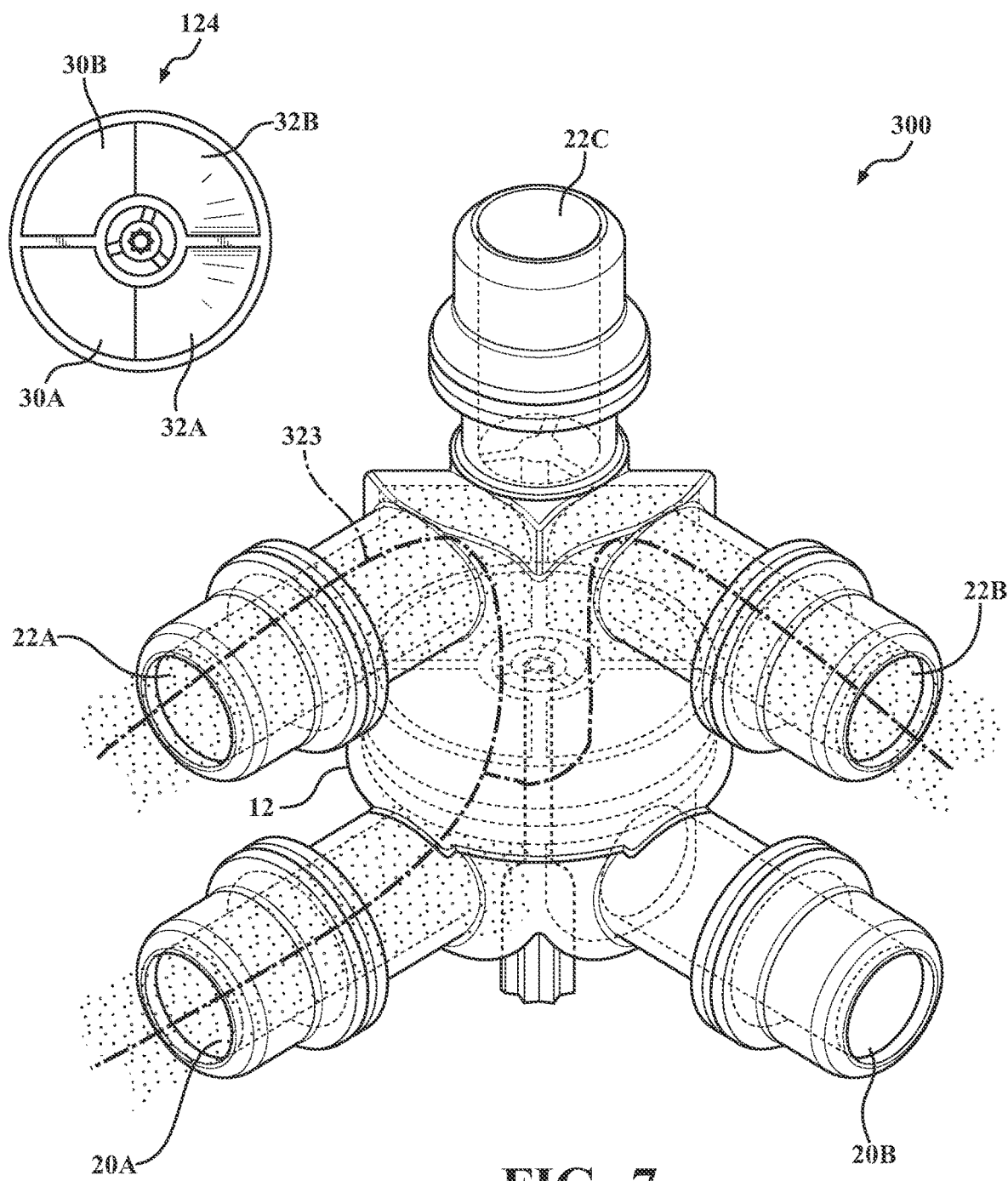
FIG. 7 is a schematic elevational view of the multi-mode fluid control valve operating in a third mode.

FIG. 7 depicts the multi-mode fluid control valve 10 operating in a third mode 300, which happens when the schematic puck 124, and puck 24 are rotated ninety degrees clockwise relative to the position of the schematic puck 124 in the second mode 200. When in the third mode 300 the puck 24 is rotated in the housing 12 to the position shown on a schematic puck 124 that is representative of a plan end view of the puck 24 when viewed from the top side of puck 24 within the housing 12 shown in FIG. 7. The position of the schematic puck 12 corresponds to the position of the puck 24 within the fluid control chamber. When in the third mode 300 there is a fluid communication path 323. The first port 22A, second port 22B and the third port 20A are ON and define the fluid communication path 323 that is schematically represented, between the fluid control chamber, the first port 22A, second port 22B and the third port 20A. The fourth port 20B and the fifth port 22C are OFF and are not in fluid communication with any other port connected to the fluid control chamber.

Referring now to FIGS. 2A, 2B and 7, in the third mode 300 the puck 24 (also represented by the schematic puck 124) is positioned so that flow deflector 32A is adjacent the second pocket 25B of the first side 14A of the housing 12 and deflects fluid to and from the second pocket 25B, which is also connected to the second port 22B, across the flow deflector 32A to the passage 30A. The passage 30A is open and positioned between first pocket 25A and second pocket 27B of the second side 14B of the housing 12, thereby allowing fluid to flow vertically between the first port 22A and the third port 22A. The stop surface 36A blocks the first pocket 27A on the second side 14B of the housing and renders the fourth port 20B OFF. Stop surface 36B blocks the closed pocket 27C and renders the fifth port 22C OFF.

Figure 8:
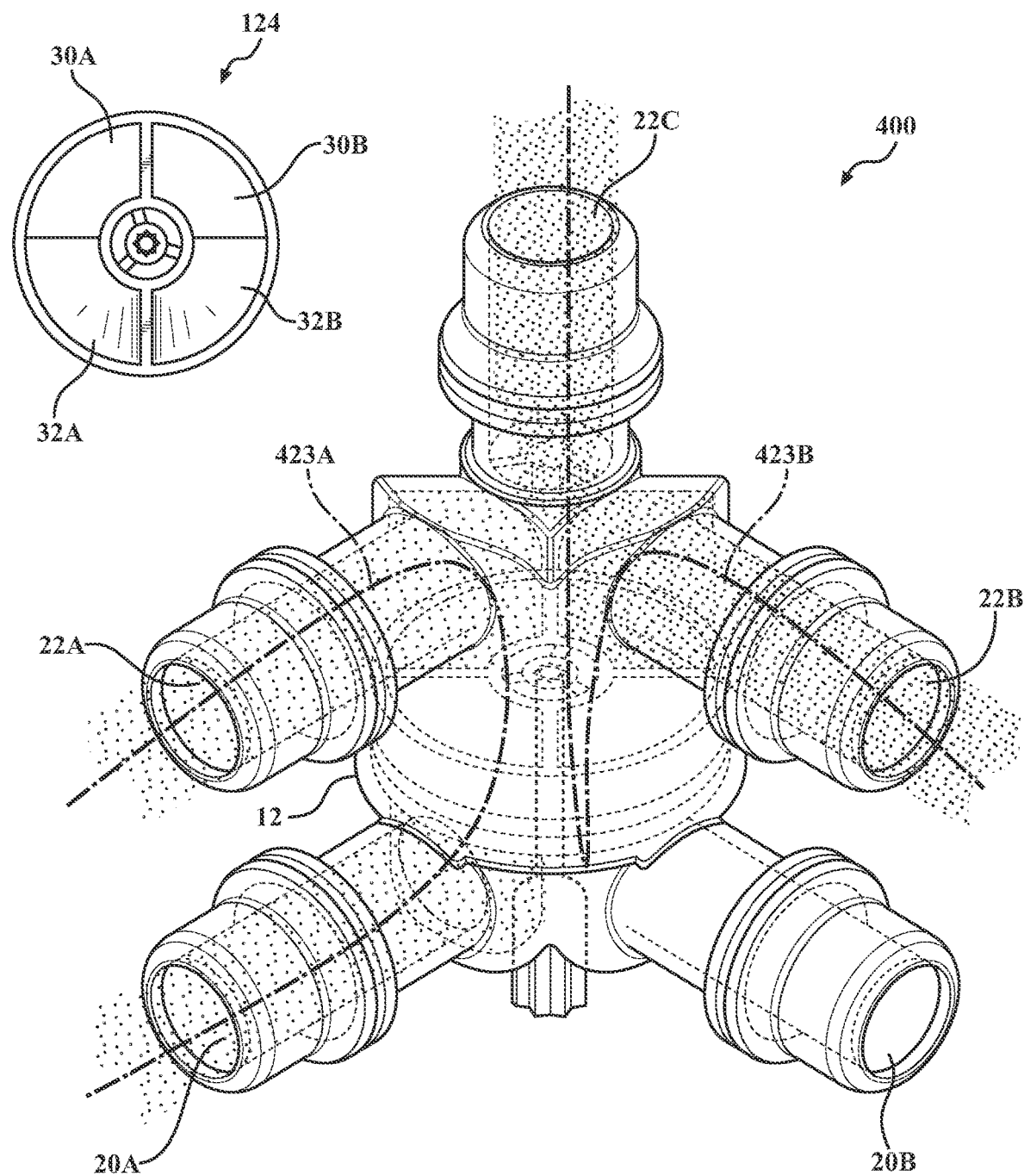
FIG. 8 is a schematic elevational view of the multi-mode fluid control valve operating in a fourth mode.
Figure 9A:
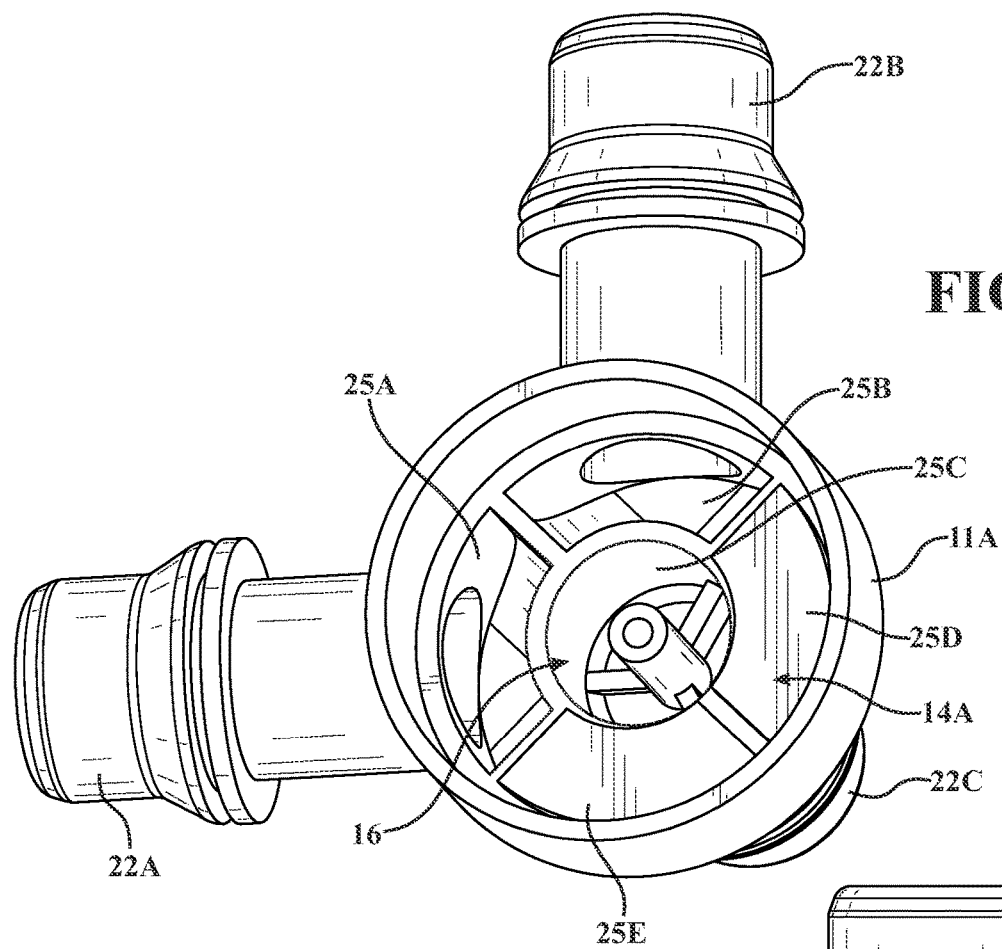
FIG. 9A is an end perspective view of a first side of the valve housing.
Figure 9B:
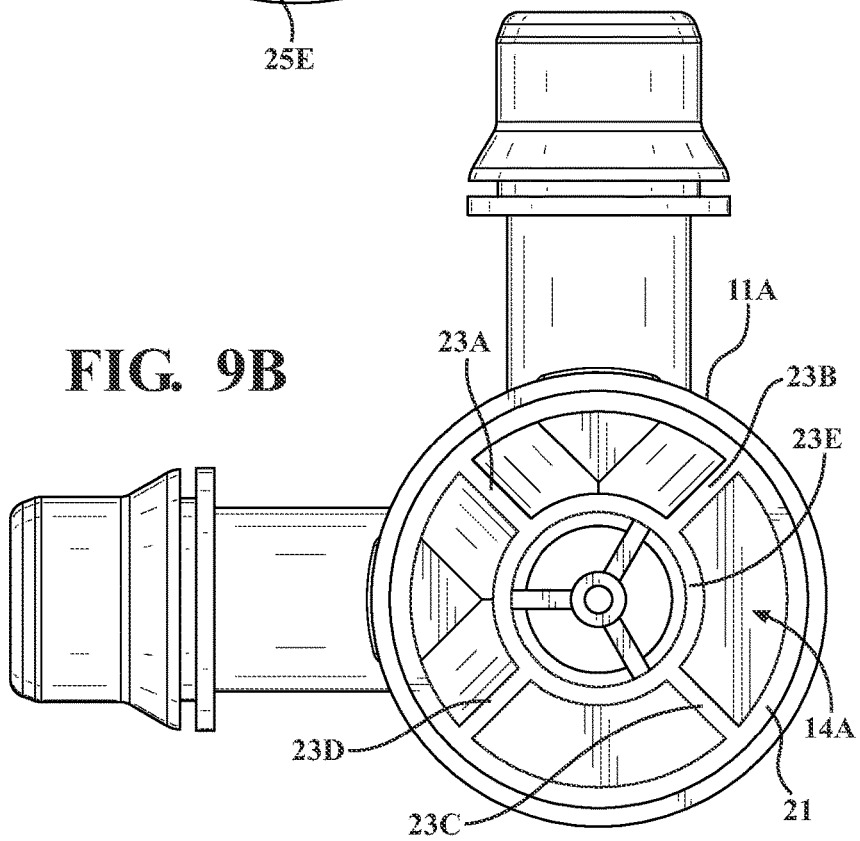
FIG. 9B is an end plan view of the first side of the valve housing.
Figure 9C:
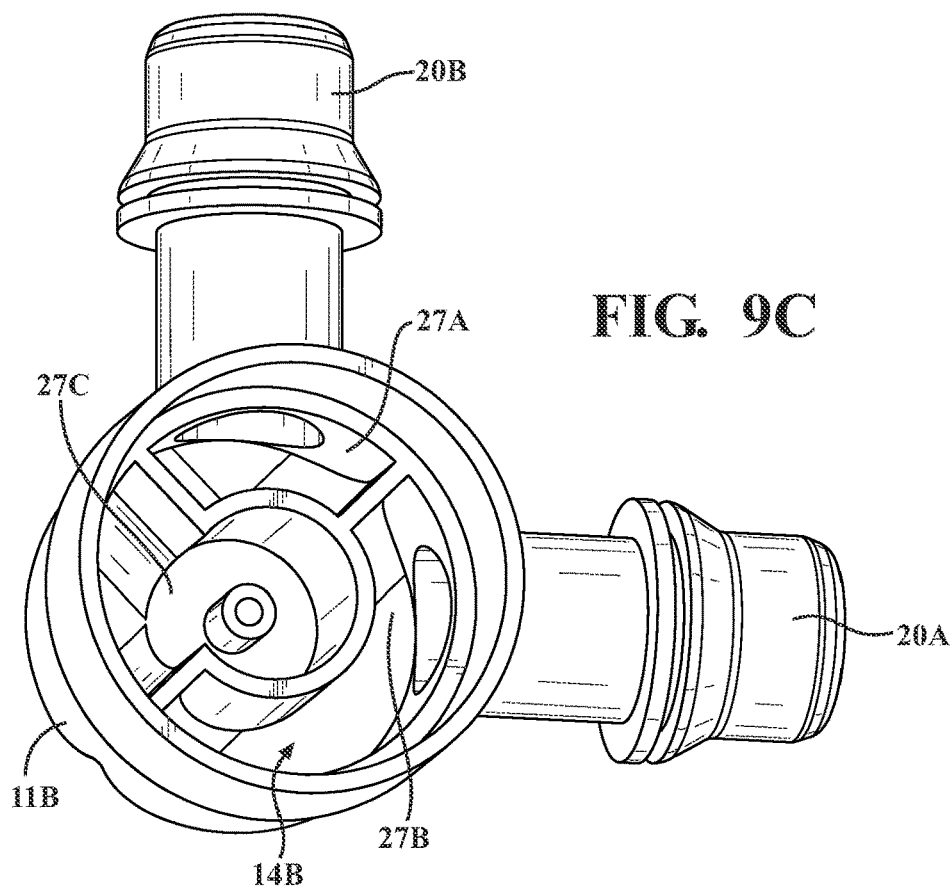
FIG. 9C is an end perspective view of a second side of the valve housing.
Figure 9D:
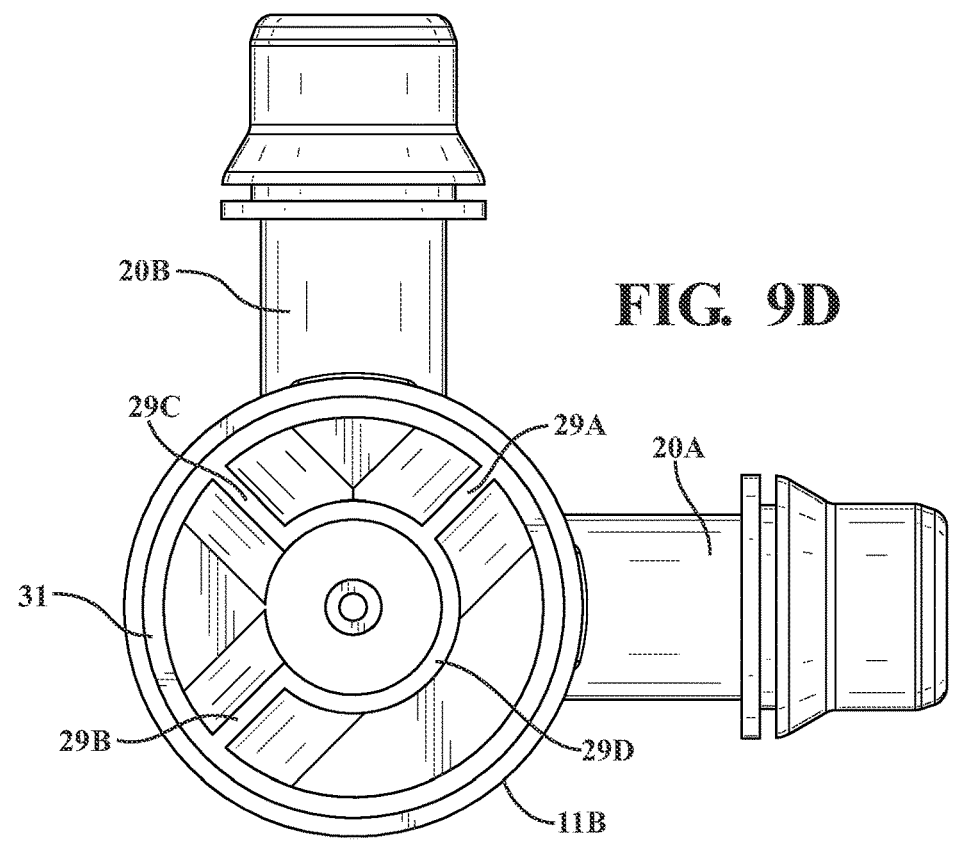
FIG. 9D is an end plan view of the second side of the valve housing.

FIG. 8 depicts the multi-mode fluid control valve 10 operating in a fourth mode 400, which happens when the schematic puck 124, and puck 24 are rotated ninety degrees clockwise relative to the position of the schematic puck 124 in the third mode 300. When in the fourth mode 400 the puck 24 is rotated in the housing 12 to the position shown on a schematic puck 124 that is representative of a plan end view of the puck 24 when viewed from the top side of puck 24 within the housing 12 shown in FIG. 8. The position of the schematic puck 12 corresponds to the position of the puck 24 within the fluid control chamber. When in the fourth mode 400 there are two separate fluid communication paths 423A, 423B. The second port 22B and fifth port 22C are ON and define the fluid communication path 423B that is schematically represented, between the fluid control chamber, the second port 22B and the fifth port 22C. The first port 22A and third port 20A are ON and define the fluid communication path 423A that is schematically represented, between the fluid control chamber, the first port 22A and third port 20A. The fourth port 20B is OFF and is not in fluid communication with any other port connected to the fluid control chamber.

Referring now to FIGS. 2A, 2B and 8, in the fourth mode 400 the puck 24 (also represented by the schematic puck 124) is positioned so that flow deflector 32A is adjacent the first pocket 25A of the first side 14A of the housing 12 and deflects fluid to and from the first pocket 25A, which is also connected to the first port 22A, across the flow deflector 32A to the passage 30A, where fluid then enters the second pocket 27B and creates the fluid communication pathway 423A between the first port 22A and the third port 20A. The flow deflector 32B is positioned adjacent the second pocket 25B of the first side 14A of the housing so that there is fluid communication between the second pocket 22B that flows across the flow deflector 32B to the passage 30B. The passage 30B is open to the closed pocket 27C that allows fluid communication to the fifth port 22C creating a fluid communication pathway 423B between through the center of the puck 24 between the second port 22B and fifth port 23C. The stop surface 36B blocks the first pocket 27A and renders the fourth port 20B OFF.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A multi-mode fluid control valve comprising:
    a housing with a fluid control chamber having a first side with a first end wall and a second side with a second end wall, where the first side has at least one port connected to the fluid control chamber and the second side has at least two ports connected to the fluid control chamber;
    a drive shaft extending at least partially into the fluid control chamber;
    a puck positioned in the fluid control chamber, wherein the puck has a first side facing the first end wall of the fluid control chamber and a second side facing the second end wall of the fluid control chamber, wherein the puck has at least two passages extending from the first side of the puck to the second side of the puck, with each of the two passages respectively having a flow diverter adjacent each of the at least two passages, wherein each flow diverter extends between the first side of the puck to the second side of the puck, and
    a drive shaft connection aperture formed on the puck for connecting the puck to the drive shaft, wherein movement of the drive shaft causes movement of the puck.

2. The multi-mode fluid control valve of claim 1 wherein the puck further includes at least two stop surfaces on the second side of the puck, each one of the at least two stop surfaces is adjacent a respective one of the at least two passages.

3. The multi-mode fluid control valve of claim 2 further comprising at least one divider wall separating the at least two passages and the flow diverter adjacent the respective one of the at least two passages.

4. The multi-mode fluid control valve of claim 1 wherein the drive shaft rotates the puck to two or more predetermined positions.

5. The multi-mode fluid control valve of claim 1 wherein the first end wall has a pocket formed thereon that is connected to the at least one port and the second end wall has a pocket formed thereon that is connected to each of the at least two ports.

6. The multi-mode fluid control valve of claim 5 wherein the first end wall further includes at least one closed pocket formed thereon.

7. The multi-mode fluid control valve of claim 1 further comprising:
    a first moving friction disk connected to the first side of the puck between the first side of the puck and the first end wall of the fluid control chamber, wherein the first moving friction disk prevents friction between the puck and the fluid control chamber;
    a second moving friction disk connected to the second side of the puck between the second side of the puck and the second end wall of the fluid control chamber, wherein the second moving friction disk prevents friction between the puck and the fluid control chamber.

8. The multi-mode fluid control valve of claim 1 wherein each flow diverter includes a respective flow transition surface that diverts fluid flow to and from the respective one of the at least two passages, wherein the flow transition surface has a sloped surface that slopes between the first side to the second side of the puck.

9. A multi-mode fluid control valve comprising:
    a housing with a fluid control chamber having a first side with a first end wall and a second side with a second end wall;
    a first port extending through the housing into the first side of the fluid control chamber;
    a second port extending through the housing into the first side of the fluid control chamber;
    a third port extending through the housing into the second side of the fluid control chamber;

a fourth port extending through the housing into the second side of the fluid control chamber;

a fifth port extending through the housing into the first side of the fluid control chamber;

a drive shaft extending at least partially into the fluid control chamber;

a puck positioned in the fluid control chamber, wherein the puck has a first side facing the first end wall of the fluid control chamber and a second side facing the second end wall of the fluid control chamber, wherein the puck has a first passage extending from the first side of the puck to the second side of the puck, a second passage extending form the first side of the puck to the second side of the puck, a first flow diverter adjacent the first passage and a second flow diverter adjacent the second passage, wherein the first flow diverter and the second flow diverter extend between the first side of the puck to the second side of the puck; and a drive shaft connection aperture formed on the puck for connecting the puck to the drive shaft, wherein movement of the drive shaft causes movement of the puck.

10. The multi-mode fluid control valve of claim 9 wherein the puck further includes a first stop surface on the second side of the puck adjacent the first passage and a second stop on the second side of the puck adjacent the second passage.

11. The multi-mode fluid control valve of claim 9 further comprising at least one divider wall separating the first passage and first flow diverter from the second passage and the second flow diverter.

12. The multi-mode fluid control valve of claim 9 wherein the drive shaft rotates the drive shaft and rotates the puck to two or more predetermined positions.

13. The multi-mode fluid control valve of claim 9 further comprising:

a first pocket formed on the first end wall where the first port enters the first side of the housing;

a second pocket formed on the first end wall where the second port enters the first side of the housing;

a third pocket formed on the second end wall where the third port enters the second side of the housing;

a fourth pocket formed on the second end wall where the fourth port enters the second side of the housing, and a fifth pocket formed on the first end wall where the fifth port enters the first side of the housing.

14. The multi-mode fluid control valve of claim 13 further comprising a first closed pocket and a second closed pocket formed on the second end wall of the second side of the housing.

15. The multi-mode fluid control valve of claim 9 further comprising:

a first moving friction disk connected to the first side of the puck between the first side of the puck and the first end wall of the fluid control chamber, wherein the first moving friction disk prevents friction between the puck and the fluid control chamber;

a second moving friction disk connected to the second side of the puck between the second side of the puck and the second end wall of the fluid control chamber, wherein the second moving friction disk prevents friction between the puck and the fluid control chamber.

16. The multi-mode fluid control valve of claim 9 wherein the first flow diverter and the second flow diverter each include a flow transition surface that diverts fluid flow to and from the respective first passage and second passage, wherein the flow transition surface has a sloped surface that slopes between the first side to the second side of the puck.

17. A method of operating a multi-mode fluid control valve comprising the steps of:

providing a housing having a fluid control chamber with a first port, a second port, a third port and a fourth port each connected to the fluid control chamber and extending through the housing;

providing a puck rotatably positioned within the fluid chamber adjacent the first port, the second port, the third port, and the fourth port, wherein the puck has a first side and a second side, and at least two passages extending from the first side to the second side of the puck and each respective one of the at least two passages has a flow diverter adjacent each respective one of the at least two passages, wherein the flow diverter extends between the first side of the puck to the second side of the puck, the puck further includes at least two stop surfaces on the second side of the puck, each one of the at least two stop surfaces is adjacent a respective one of the at least two passages and at least one divider wall separating the at least two passages and the adjacent flow diverter;

rotating the puck within the control chamber to a first mode position, wherein the first port, the second port and the fourth port are ON so that there is fluid communication between the fluid control chamber, the first port, the second port and the fourth port, and the third port is OFF so there is no fluid communication between the fluid control chamber and the third port;

rotating the puck within the control chamber to a second mode position, wherein the first port and third port are ON so that there is fluid communication between the fluid control chamber, the first port, the second port and the second port and the fourth port are ON so that there is fluid communication between the fluid control chamber, the second port and the fourth port independent from the fluid communication between the first port, the third port and the fluid control chamber; and rotating the puck within the control chamber to a third mode position, wherein the first port, the second port and the third port are ON so that there is fluid communication between the fluid control chamber, the first port, the second port and the third port, and the fourth port is OFF so that there is no fluid communication between the fluid control chamber and the fourth port.

18. The method of claim 17 further comprising the steps of: providing a fifth port in the connected to the fluid control chamber; and rotating the puck within the control chamber to a fourth mode position, wherein the first port, the second port and the fourth port are ON so that there is fluid communication between the fluid control chamber, the first port, the second port and the fourth port, wherein the third port OFF so that there is no fluid communication between the fluid control chamber and the third port.

19. The method of the claim 18 wherein when the puck is in any one of the first mode, the second mode and the third mode the fifth port is OFF so that there is no fluid communication between the fluid control chamber and the fifth port.

20. The method of claim 18 wherein the first mode position further includes at least one of the two passages of the puck positioned in the fluid chamber between the second port and the fourth port, while the adjacent flow diverter provides fluid communication with the first port and one of the at least two stop surfaces blocks fluid communication with the third port.

* * * * *